United States Patent
Seok et al.

(10) Patent No.: US 8,259,632 B2
(45) Date of Patent: Sep. 4, 2012

(54) PEER POWER SAVE MODE IN TUNNELED DIRECT LINK SETUP (TDLS) WIRELESS NETWORK

(75) Inventors: Yong Ho Seok, Seoul (KR); Dong Hi Sim, Seoul (KR); Ji Young Huh, Seoul (KR); Alexander A. Safonov, Moscow (RU); Sook Hyun Yang, Seoul (KR); Jae Young Lee, Gwangmyeong (KR)

(73) Assignee: LG Electronics Inc., Seoul (KR)

( * ) Notice: Subject to any disclaimer, the term of this patent is extended or adjusted under 35 U.S.C. 154(b) by 1072 days.

(21) Appl. No.: 12/045,493

(22) Filed: Mar. 10, 2008

(65) Prior Publication Data

US 2008/0219228 A1    Sep. 11, 2008

(30) Foreign Application Priority Data

| Mar. 10, 2007 | (KR) | 10-2007-0023775 |
| Nov. 12, 2007 | (KR) | 10-2007-0115094 |
| Jan. 12, 2008 | (KR) | 10-2008-0003701 |
| Feb. 18, 2008 | (KR) | 10-2008-0014306 |

(51) Int. Cl.
   *G08C 17/00*    (2006.01)
(52) U.S. Cl. ............ 370/311; 370/395.2; 370/401; 370/461; 455/574; 455/127.5
(58) Field of Classification Search ......... 370/311, 370/395.2, 395.21, 401, 461
   See application file for complete search history.

(56) References Cited

U.S. PATENT DOCUMENTS

| 6,088,591 A * | 7/2000 | Trompower et al. ......... 455/438 |
| 2005/0036469 A1* | 2/2005 | Wentink ..................... 370/338 |
| 2005/0122927 A1* | 6/2005 | Wentink ..................... 370/311 |

FOREIGN PATENT DOCUMENTS

| JP | 2000194633 | 7/2000 |
| JP | 2004152268 | 5/2004 |
| JP | 2006020289 | 1/2006 |
| JP | 2006127230 | 5/2006 |
| WO | 2005/067535 | 7/2005 |
| WO | 2005067535 | 7/2005 |
| WO | WO 2005/067535 | 7/2005 |
| WO | WO 2006/081123 | 8/2006 |

* cited by examiner

*Primary Examiner* — Bo Hui A Zhu
(74) *Attorney, Agent, or Firm* — Lee, Hong, Degerman, Kang & Waimey

(57) ABSTRACT

A protocol for a peer power save mode (PPSM) in a tunneled direct link setup (TDLS) wireless network and a system therefor are provided. A station (STA) set up a TDLS link can send a frame having a power management bit set to a peer STA to enter into a power save mode (PSM). In this case, the station entering into the PSM operates in a PPSM client mode. When the peer STA operates in the PPSM client mode, the STA can operate in the PPSM access point (AP) mode or can enter into the PPSM client mode. The STA operating in the PPSM AP mode buffers data for the STA operating in the PPSM client mode and informs the peer STA of information indicating that there is buffered data by the use of a peer traffic indication frame or the like. In principle, a U-APSD procedure can be applied to the transmission of data through a direct link from the STA operating in the PPSM AP mode to the STA operating in the PPSM client mode.

4 Claims, 13 Drawing Sheets

FIG. 2

| TDLS Type Value | Meaning |
|---|---|
| 0 | TDLS Setup Request |
| 1 | TDLS Setup Response |
| 2 | TDLS Setup Confirm |
| 3 | TDLS Teardown Request |
| 4 | TDLS Teardown Response |
| 5 | TDLS Tx Path Switch Request |
| 6 | TDLS Tx Path Switch Responce |
| 7 | TDLS Rx Path Switch Request |
| 8 | TDLS Rx Path Switch Responce |
| 2 | Peer Traffic Indication |
| 9-255 | Reserved |

FIG. 4

| Order | Information |
|---|---|
| 1 | Link Identifier |
| 2 | Association Request frame body |
| 3 | Dialog Token |
| 4 | RSNIE_I |
| 5 | SMK Message 1 FTIE |
| 6 | QoS Capability |

Octets:     1     1     1

FIG. 7

| Element ID | Length | Capabilities |
|---|---|---|

Octets:    1         1          n

FIG. 8

| Order | Information |
|---|---|
| 1 | Link Identifier |
| 2 | Status Code |
| 3 | Association Request frame body |
| 4 | Dialog Token |
| 5 | RSNIE_P |
| 6 | SMK Message 2 FTIE |
| 7 | QoS Capability |

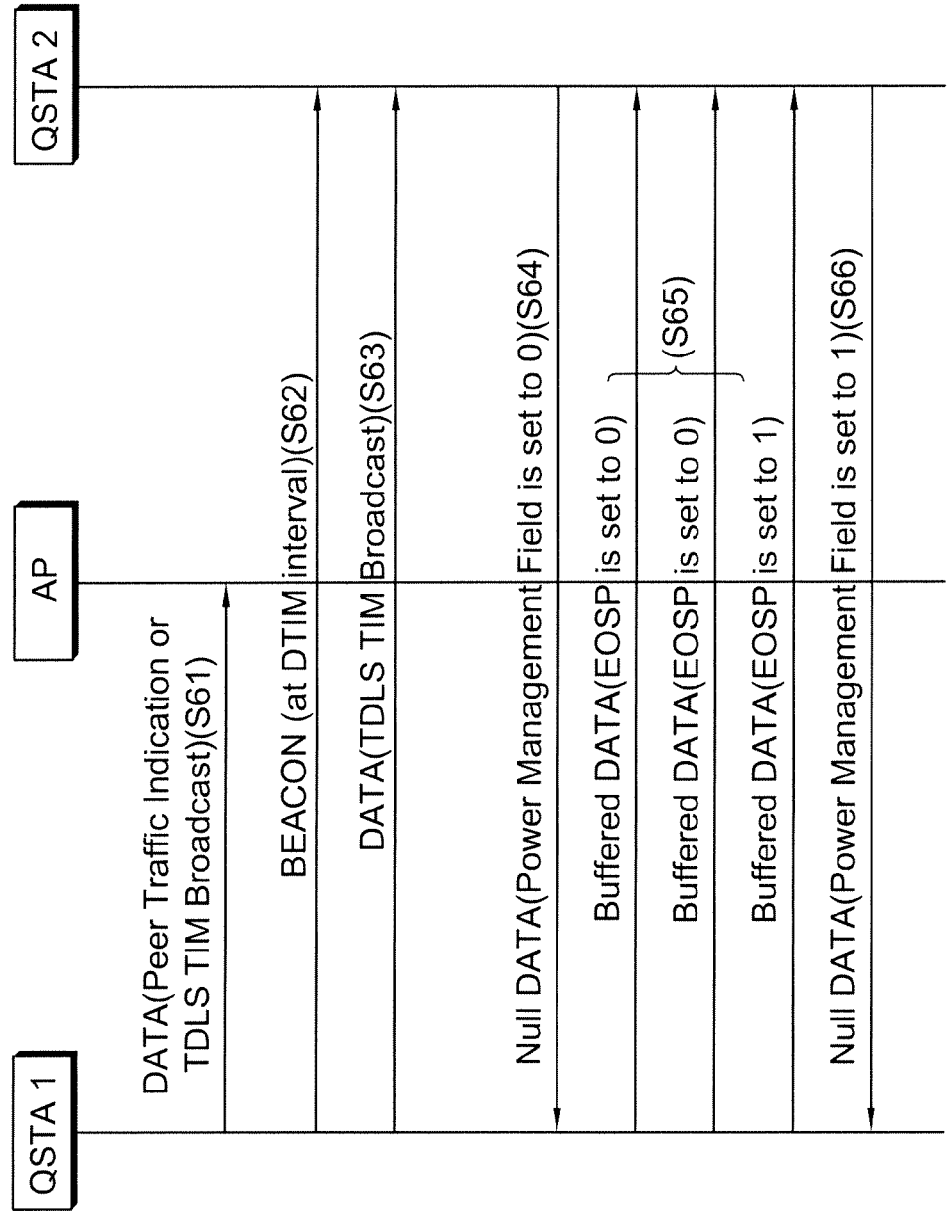

PEER POWER SAVE MODE IN TUNNELED DIRECT LINK SETUP (TDLS) WIRELESS NETWORK

CROSS-REFERENCE TO RELATED PATENT APPLICATIONS

This application claims the benefits of Korean Patent Applications Nos. 10-2007-0023775 filed on Mar. 10, 2007, 10-2007-0115094 filed on Nov. 12, 2007, 10-2008-0003701 filed on Jan. 12, 2008 and 10-2008-0014306 filed on Feb. 18, 2008 in the Korean Intellectual Property Office, the disclosures of which are incorporated herein in its entirety by reference.

BACKGROUND

1. Field of the invention

The present invention relates to a wireless local area network (WLAN), and more particularly, to a peer power save mode (PPSM) in a tunneled direct link setup (TDLS) wireless network.

2. Description of the Related Art

With development of information communication technologies, a variety of wireless communication technologies have been developed. A wireless LAN (WLAN) is a technology permitting wireless access to Internet in specific service areas such as home or companies or air planes by the use of portable terminals such as a personal digital assistant (PDA), a laptop computer, and a portable multimedia player (PMP) on the basis of a radio frequency technology.

These days, thanks to the increased availability of WLANs, portable terminal users such as laptop computer users are able to perform their tasks with increased mobility. For example, a user can take his laptop computer from his desk into a conference room to attend a meeting and still have access to his local network to retrieve data and have access to the Internet via one or more modems or gateways present on the local network without being tethered by a wired connection. Similarly, business travelers commonly use their portable terminals to gain access to their email accounts, to check if there is any unread email, and to read and send email.

In the initial WLAN technology, a data rate of 1 to 2 Mbps was supported by the use of frequency hopping, spread spectrum, and infrared communication using a frequency of 2.4 GHz. In recent years, with the development of the wireless communication technology, 54 Mbps in maximum can be supported by applying the orthogonal frequency division multiplex (OFDM) technology, etc. to the WLAN. In addition, in the IEEE 802.11 has developed or is developing wireless communication technologies for improvement in quality of service (QoS), compatibility of an access point (AP) protocol, security enhancement, wireless resource measurement, wireless access in vehicular environment, fast roaming, mesh network, inter-working with external networks, wireless network management, and the like.

In the IEEE 802.11, a basic service set (BSS) means a set of stations (STAs) successfully synchronized. A basic service area (BSA) means an area including members of the BSS. The BSA can vary depending on propagation characteristics of a wireless medium and thus the boundary is not clear. The BSS can be basically classified into two kinds of an independent BSS (IBSS) and an infrastructured BSS. The former means a BSS that constitutes a self-contained network and that is not permitted to access a distribution system (DS). The latter means a BSS that includes one or more access points (AP) and a distribution system and that uses the APs in all the communication processes including communications between the stations.

In the initial WLAN communication procedure, the infrastructured BSS required to transmit data necessarily through the AP without permitting the direct transmission of data between non-AP stations (non-AP STAs). In recent years, a direct link setup (DLS) between the non-PA STAs was supported to improve the efficiency of wireless communications. Accordingly, in the BSS supporting the QoS, that is, in the QBSS including QoS STAs (QSTA) and QoS APs (QAP), the non-AP STAs can set up a direct link and directly communicate with each other through the direct link.

SUMMARY

As described above, the existing DLS procedure is on the premise that the BSS is the QBSS supporting the QoS. In the QBSS, the AP as well as the non-AP STA is a QAP supporting the QoS. In the most WLAN environments currently used (for example, WLAN environments in accordance with the IEEE 802.11a/b/g), the non-AP STAs are QSTAs supporting the QoS but the APs are legacy APs not supporting the QoS. As a result, in the WLAN environments currently used, even a QSTA cannot enjoy the DLS service.

A TDLS (Tunneled Direct Link Setup) is a wireless communication protocol newly suggested to overcome such a limit. The TDLS does not support the QoS, but allows the QSTAs to set up a direct link in the currently used WLAN environments accordance with the IEEE 802.11a/b/g). Accordingly, the TDLS defines procedures of allowing the QSTAs to set up a direct link even in the BSS managed by the legacy AP. Hereinafter, a wireless network supporting the TDLS procedure is referred to as a TDLS wireless network.

On the other hand, the non-AP STAs constituting the BSS can operate in one of two power management modes of an active mode (AM) and a power save mode (PSM). Since the non-AP STA is generally a user's portable device, it is necessary to support the PSM so as to effectively manage the power. In this case, data or a management frame should be transmitted to the STA operating in the PSM. This is true when the STA sets up a direct link with the opposite non-AP STA (hereinafter, referred to as "peer STA"). Accordingly, a procedure of allowing a QAP to temporarily buffer data for QSTAs in the PSM and to transmit the buffered data to the QSTAs is defined in the existing wireless communication networks.

The wireless communication protocol for allowing a non-AP STA to operate in the PSM and transmitting frames to the non-AP STA operating in the PSM is also necessary for the TDLS wireless network. However, in the TDLS wireless network, since the AP is a legacy AP not supporting the QoS, the wireless communication protocol of buffering data for the STA as a QAP operating in the PSM and regulating a communication procedure between the QAP and the STA in the PSM to transmit buffered frames cannot be applied to the TDLS wireless network without any change.

Accordingly, a goal of the invention is to provide an operation procedure of a STA, a communication procedure in a TDLS wireless network, and a device for supporting the procedures, that can allow a non-AP STA to operate in the PSM in the TDLS wireless network and that can allow a peer STA of a TDLS link to transmit data buffered for the STA operating in the PSM.

Another goal of the invention is to provide an operation procedure of a STA, a communication procedure in a TDLS wireless network, and a device for supporting the procedures, that can allow a non-AP STA operating in the PSM to receive frames through a setup direct link in the TDLS wireless network.

In order to accomplish the above-mentioned goal, a peer power save mode (PPSM) is defined in the invention. The PPSM can be used in STAs (Non-AP STAs) supporting the TDLS protocol. A pair of STAs setting up a TDLS link in the PPSM in a TDLS wireless network can operate in a PPSM client mode and a PPSM AP mode.

When the opposite of the TDLS link, that is, a peer STA, is a terminal supporting the PPSM AP mode, the STA can enter into the PPSM client mode while remaining on the TDLS link. Here, "the STA remains on the TDLS link" means that the STA enters into the PSM mode without receiving frames through the TDLS link. Accordingly, a STA operating in the PPSM client mode can enter into the PSM mode without changing the frame receiving path to the AP path and can receive the frames buffered by the peer STA through the TDLS link without performing a process of changing the receiving path to the direct path after changing the PSM to the AM.

One method of allowing a STA to enter into the PPSM client mode is to use power management information. For example, a STA to enter into the PPSM client mode can enter into the PSM after transmitting a frame of which the power management information is a value indicating the PSM mode, for example, of which the power management bit is set to "1" to the peer STA.

The STA can inform the opposite STA of PPSM-related information, for example, whether the STA supports the PPSM client mode and/or the PPSM AP mode, in the TDLS procedure with the opposite STA. For example, the STA can inform capability information of a terminal associated with the PPSM by the use of a TDLS request frame and/or a TDLS response frame. More particularly, information element for specifying the capability information of a STA can be used in the TDLS request frame or the TDLS response frame. For example, the information element may be a QoS information element or an extended capability information element.

The STA in the PPSM AP mode temporarily buffers frames to be transmitted to the peer STA for the peer STA operating in the PPSM client mode. According to embodiments of the invention, the frames buffered by the STA in the PPSM AP mode can be transmitted to the peer STA in the PPSM client mode in accordance with the existing U-APSD (Unscheduled-Automatic Power Save Delivery) procedure. However, since the STA in the PPSM AP mode is a Non-AP STA and the peer STA in the PSM mode cannot be directly informed that the STA in the PPSM AP mode has frames to transmit, a new procedure for informing such a fact through a legacy AP is required.

More particularly, when data corresponding to a predetermined AC is backlogged and no service period (SP) is generated for the AC during a PPSM indication window period before a new traffic arrives, the STA in the PPSM AP mode informs the STA in the PPSM client mode that data is backlogged in the AC through the AP. For example, a peer traffic indication frame can be used for the notification, and the peer traffic indication frame can be transmitted in a uni-cast manner.

The peer traffic indication frame is used to inform whether data is backlogged in each AC and/or how much the data is backlogged and is a new type of TDLS frame defined in the invention. The peer traffic indication frame can include PPSM indication window information in addition to information on the backlogged data. The PPSM indication window information is an example of information indicating the minimum interval between the peer traffic indication frames continuously transmitted to the same peer STA and the name is exemplary. That is, the PPSM indication window information may be called a different name. The PPSM indication window information can be displayed in the form of a multiple of a beacon interval.

In the PPSM according to an embodiment of the invention, to information the peer STA in the PPSM client mode that data is buffered in the STA in the PPSM AP mode, the STA sends a TDLS frame such as the peer traffic indication frame to the peer STA through a legacy AP. In the embodiments of the invention, the PPSM indication window information is used to reduce the number of times for continuously transmitting the peer traffic indication frame to the STA in the PPSM client mode. To reduce the number of peer traffic indication frames transmitted fro a continuous uni-directional traffic stream without any return traffic, a new service period may be started within the PPSM indication window after the occurrence of a service interval during which a data MPDU was received.

A peer power save mode (PPSM) in the TDLS wireless network is newly defined in the invention. By using the PPSM, a STA having set up a TDLS link can enter into the PSM without changing a data receiving path to an AP path by maintaining the TDLS link with the peer STA. The STA in the PPSM AP mode can temporarily buffer frames for the peer STA in the PSM, inform the peer STA of the fact through a legacy AP, and transmit the temporarily buffered frames to the peer STA through the direct path, but not through the legacy AP. Accordingly, according to the embodiments of the invention, it is possible to effectively support a STA so as to operate in the PSM in the TDLS wireless network.

BRIEF DESCRIPTION OF THE DRAWINGS

FIG. 2 is a diagram illustrating an example of a type of the TDLS frame and values corresponding thereto.

FIG. 4 is a diagram illustrating an example of information included in a TDLS request frame.

FIG. 7 is a diagram illustrating a format of an extended capability information element included in the TDLS request frame and the TDLS response frame.

FIG. 8 is a diagram illustrating an example of information included in the TDLS response frame.

FIG. 13 is a message flowchart illustrating a procedure of allowing a first STA STA1 to transmit data to a second STA STA2 through a TDLS path according to a second embodiment of the invention.

DESCRIPTION OF EXEMPLARY EMBODIMENTS

Figure 1:
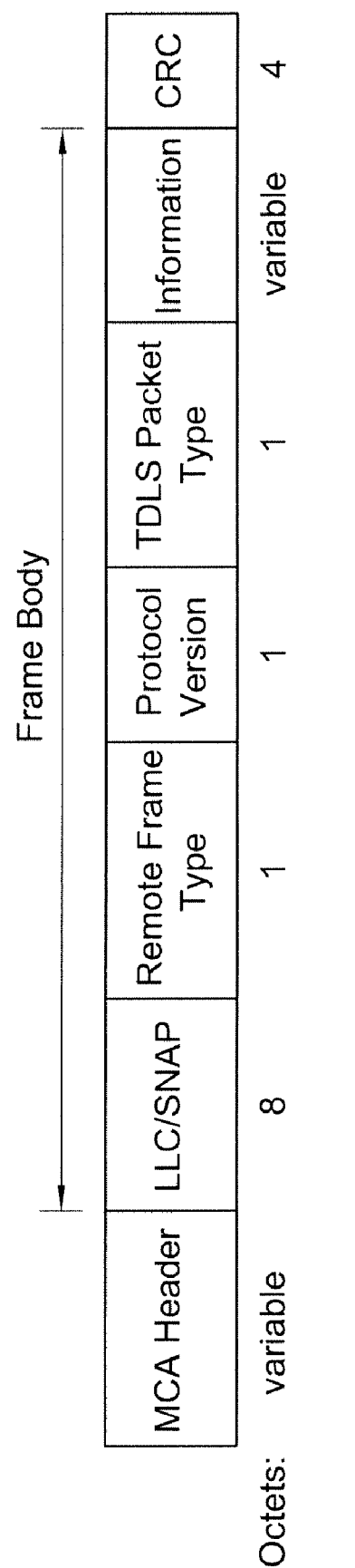
FIG. 1 is a diagram illustrating a format of a medium access control (MAC) frame associated with a TDLS procedure.

Hereinafter, exemplary embodiments of the invention will be described in detail with reference to the accompanying drawings.

In a TDLS wireless network employing an embodiment of the invention, even non-AP STAs associated with a legacy AP can set up a TDLS link as a direct link therebetween and tear down the set-up TDLS link. In order that a STA sets up or tears down the TDLS link with a peer STA, they can transmit management action frames therefor such as TDLS frames therebetween through a legacy AP. However, the legacy AP cannot be directly involved in allowing two non-AP STAs to set up the TDLS link.

One method for solving such a problem is to encapsulate the TDLS frame in the form of a data frame and to transmit the encapsulated TDLS frame to the peer STA through the legacy AP. Accordingly, the legacy AP performs only a function of relaying the communication between the non-AP STAs and is not involved in setting up, tearing down, and managing the TDLS link. An embodiment described later can be usefully applied to the TDLS wireless network in which the TDLS frames encapsulated in the form of a data frame are transmitted for the purpose of setting up, tearing down, and managing the TDLS link.

Among constituent elements of the TDLS wireless network, the non-AP STA is a device including a medium access control complying with the IEEE 802.11 standard and physical layer interface for wireless mediums. The non-AP STA is not an AP but a wireless station, and may be called wireless transmitting/receiving unit (WTRU), a user equipment (UE), a mobile station (MS), or a mobile subscriber unit.

The non-AP STA includes a processor and a transceiver and may further include a user interface and a display unit. The processor is a functional unit designed to generate frames to be transmitted through the wireless network or to process frames received through the wireless network and serves to control stations and to process a variety of signals input by a user or for the user. The transceiver is functionally connected to the processor and is a unit designed to transmit and receive frames through the wireless network for the stations.

The non-AP STA supports the PPSM in the TDLS wireless network described later. Accordingly, the non-AP STA set up a TDLS link with the peer non-AP STA can operate in one of two modes associated with power management. The first mode is a PPSM AP mode in which a STA in the PPSM AP mode temporarily buffers data for the peer non-AP STA operating in a power save mode and transmits the buffered data to the peer non-AP STA through the TDLS link in accordance with a predetermined message transmitting procedure described later. The second mode is a PPSM client mode in which the STA in the PPSM client mode can enter into the PSM without tearing down the TDLS link. The STA in the PPSM client mode can receive the data buffered in the STA in the PPSM AP mode through the direct link in accordance with the predetermined message transmitting procedure described later.

The AP is has a wireless station function and a functional entity providing access to a distribution system (DS) through a wireless medium for the associated wireless station. In an embodiment of the invention, the AP may be a legacy AP not supporting the QoS. The AP may be called a centralized controller, a base station (BS), node B, or a site controller.

FIG. 1 is a diagram illustrating a format of a medium access control (MAC) frame (hereinafter, referred to as "TDLS frame") which is a first non-AP STA transmits and receives to and from an opposite non-AP STA (peer non-AP STA) through a legacy AP in the TDLS wireless network. Referring to FIG. 1, the TDLS frame includes a MAC header field, a logical link control (LLC)/sub-network access protocol (SNAP) field, a remote frame type field, a TDLS packet type field, an information field, and a cyclic redundancy code (CRC) field. The TDLS frame may further include a protocol version field.

Information common to almost all the types of frames is contained in the MAC header field. For example, the MAC header field may include a frame control field, a duration/ID field, plural address fields (Address1, Address2, Address3, and Address4), a sequence control field, and/or a QoS control field.

The frame control field includes a protocol version field, a type and subtype field for identifying functions of frames, an additional fragment field (more fragments)indicating whether an additional fragment of a current MSDU or MMPDU exists, a retry field indicating whether a frame is retransmitted, and a power management field indicating whether it operates in a power save mode. The power management field of the frame control field indicates a mode in which the STA operates after exchange of a series of frames. For example, when the power management field is set to "0", it means that the STA having transmitted the frame operates in an active mode. However, when the power management field is set to "1", it means that the STA having transmitted the frame operates in the PPSM.

The QoS control field serves to identify a traffic category (TC) or a traffic stream (TS) to which the frame belongs and a variety of QoS-related information of the frame which varies depending on the frame type and the sub-frame type. The QoS control field can be contained all the TDLS frames of which the QoS subfield of the subtype field is set to "1". The QoS control field includes 5 subfields and examples and various layouts of the subfields are shown in Table 1.

TABLE 1

| Applicable Frame (sub) Types | Bits 0-3 | Bit 4 | Bits 5-6 | Bit 7 | Bits 8-15 |
| --- | --- | --- | --- | --- | --- |
| QoS (+)CF-Poll frames sent by HC | TID | EOSP | Ack Policy | Reserved | TXOP limit |
| QoS Data, QoS Null, and QoS Data + CF-Ack frames sent by HC | TID | EOSP | Ack Policy | Reserved | AP PS Buffer State |
| QoS data frames sent by non-AP to an AP | TID | 0 | Ack Policy | Reserved | TXOP Duration Requested |
|  | TID | 1 | Ack Policy | Reserved | Queue Size |
| QoS Data, QoS Null, and QoS Data + CF-Ack frames sent over the direct link | TID | EOSP | Ack Policy | Reserved | Reserved |

Referring to FIG. 1, the LLC/SNAP field includes an LLC/SNAP header. The remote frame type field can be set to a value (for example, "2") indicating a TDLS frame. The protocol version field can be set to a value indicating the protocol version of the transmitted/received message.

The TDLS packet type field is set to a value for specifying the type of the TDLS frame. Examples of the type of the TDLS frame and the value corresponding thereto are shown in FIG. 2. Referring to FIG. 2, the TDLS frame includes a TDLS request frame, a TDLS response frame, a TDLS confirmation frame, a TDLS Rx switch request frame, and a TDLS Rx switch response frame. In the embodiment of the invention, a frame type for informing that the STA in the PPSM AP mode buffers data to be transmitted to the STA in the PPSM client mode is newly defined. The new type of frame may be a peer traffic indication frame. However, the name of the new type of frame is not limited to it, but may be a TDLS traffic indication message (TIM) frame or the like. The specific application of the peer traffic indication frame will be described later.

The information field of the TDLS frame includes a variety of information individually specified depending on the types of the TDLS frames and the included information is different depending on the TDLS type. The error correcting field (CRC) includes additional information for correcting an error of the frame.

Figure 3:
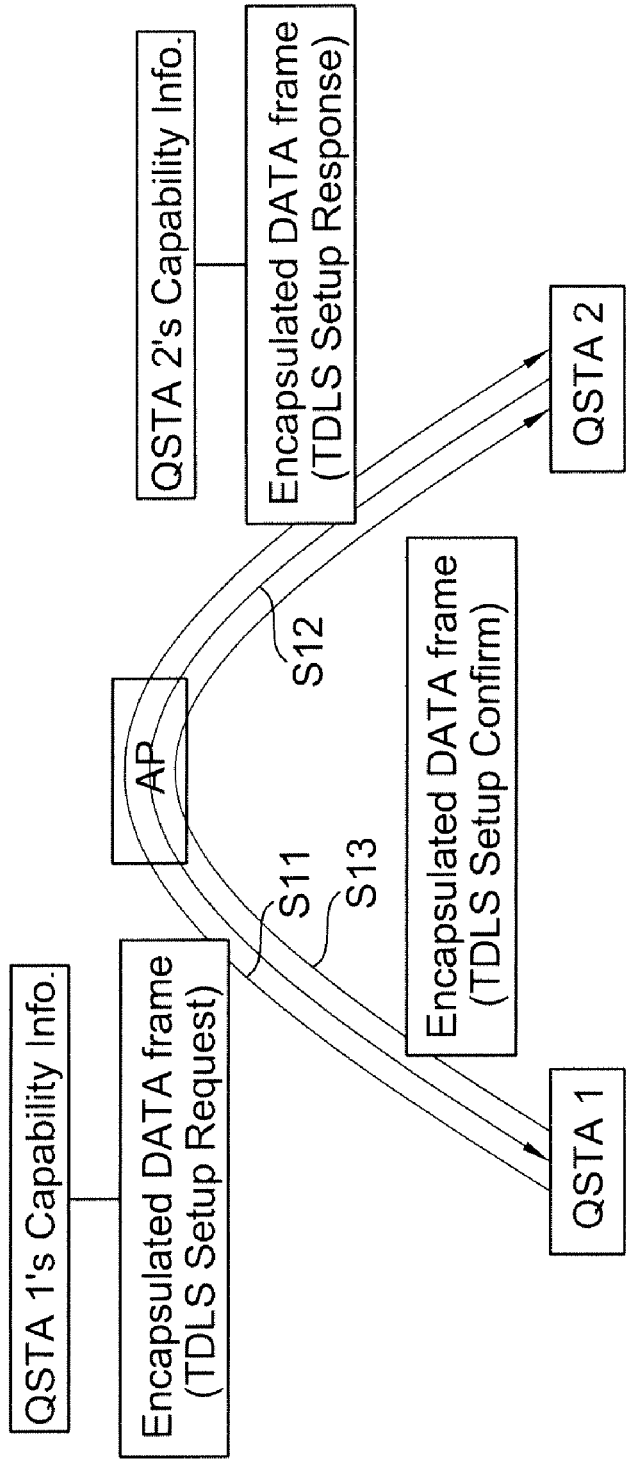
FIG. 3 is a message flowchart illustrating a TDLS procedure.

FIG. 3 is a message flowchart illustrating a TDSL setup procedure in the TDLS wireless network including two non-AP STAs (hereinafter, simply referred to as "STA") and a legacy AP.

Referring to FIG. 3, the first STA to set up a direct link with the second STA transmits a frame for requesting for setting up the direct link, for example, a TDLS request frame, to the second STA through the AP (S11). In the TDLS request frame, the TDLS packet type field of the TDLS frame shown in FIG. 1 can be set to a value indicating the TDLS request. Accordingly, in step S11, the TDLS request is encapsulated in the form of a data frame and is then transmitted. As a result, the AP performs a function of relaying the received frame to the second STA, when the received frame is the TDLS request frame.

FIG. 4 shows information included in the information field of the TDLS request frame (in the information field of the TDLS frame shown in FIG. 1). Referring to FIG. 4, the information field of the TDLS request frame includes link ID information, association request frame body information, dialog token information, and QoS capability information of the first STA. The information field of the TDLS request frame may further includes capability information or extended capability information.

Figure 5:
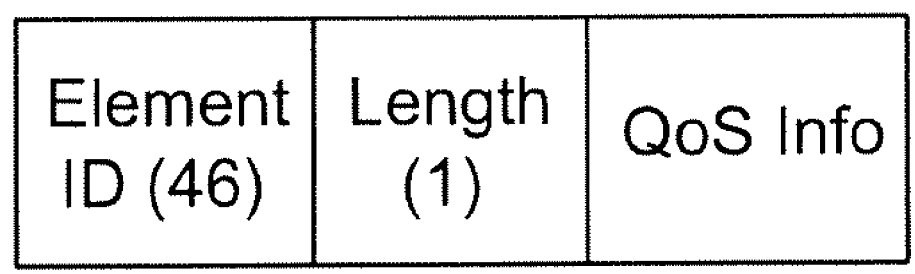
FIG. 5 is a diagram illustrating a format of a QoS capability information element included in a TDLS request frame and a TDLS response frame.

FIG. 5 is a diagram illustrating a format of the QoS capability information. The QoS capability information is used to inform the QoS capability supported by the first STA transmitting the QoS capability information. According to the embodiment of the invention, the QoS capability information element is used for the first STA or the second STA entering into the PPSM to inform the peer QSTA of a trigger-enabled access category and/or a deliver-enabled access category supported by it. Referring to FIG. 5, the QoS capability information includes an element ID field, a length ID field, and a QoS information field.

Figure 6:
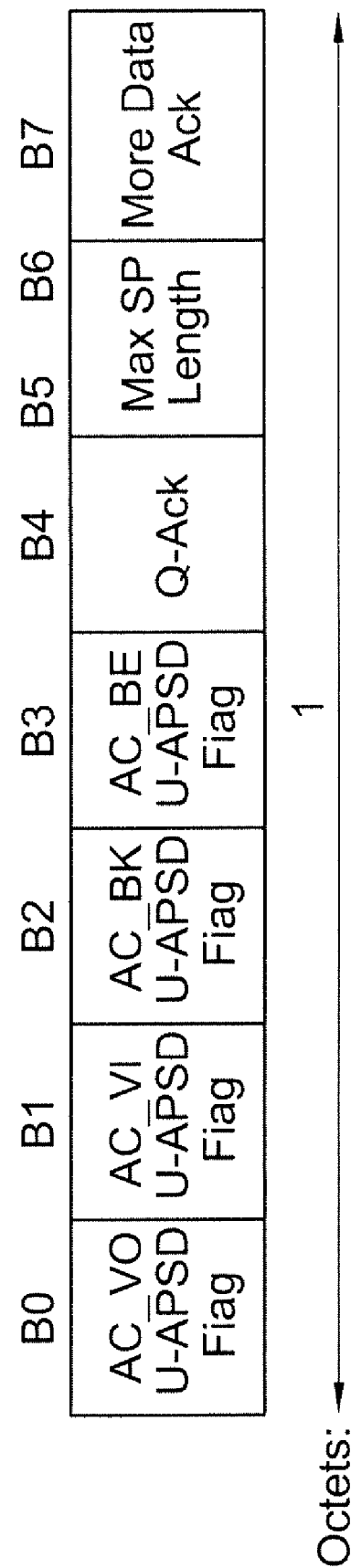
FIG. 6 is a diagram illustrating a format of a QoS information field (QoS Info) shown in FIG. 5.

FIG. 6 is a diagram illustrating an example of the format of the QoS information field shown in FIG. 5. Referring to FIG. 6, the QoS information field includes an AC_VO U-APSD flag bit, an AC_VI U-APSD flag bit, an AC_BK U-APSD flag bit, an AC_BE U-APSD flag bit, a Q-Ack bit, a maximum service period length bit, and an additional data Ack bit. The information included in the QoS information field indicates the trigger-enabled access category and/or the deliver-enabled access category of the STA transmitting it.

When the U-APSD flag bit of any access category in the QoS information is set to "1", the access category (AC) is set to the trigger-enabled access category and/or the deliver-enabled access category. On the other hand, When the U-APSD flag bit of any access category in the QoS information is set to "0", a data frame of the access category (AC) is transmitted in accordance with not the U-APSD procedure but a normal message transmitting procedure. That is, during a service period (SP), the STA in the active mode or the PPSM AP mode is not permitted to transmit data regardless of the PS-Poll, and the STA in the PPSM AP mode transmits the data frame only when the STA in the PSM or the PPSM client mode sends the PS-Poll.

FIG. 7 is a diagram illustrating a format of the extended capability information element as an information element included in the TDLS request frame. According to the embodiment of the invention, the extended capability information indicates whether the first or second STA supports the PPSM AP mode and/or the PPSM client mode. Information indicating whether the STA supports the PPSM AP mode and/or the PPSM client mode may be included another information element indicating the capability of the STA (for example, the capability information element or the QoS capability information element). Referring to FIG. 7, the extended capability information includes an element ID field, a length ID field, and a capability field, and the capability field includes PPSM-related mode information supported by the STA.

Referring to FIG. 3, the second STA having received the TDLS request frame transmits a TDSL response frame to the first STA through the AP in response to the request (S12). In this case, in the TDLS response frame, the TDLS packet type field of the TDLS frame shown in FIG. 1 is set to a value indicating the TDLS response. Accordingly, the TDLS response is encapsulated in the format of a data frame and is transmitted to the first STA through the AP.

FIG. 8 is a diagram illustrating information included in the information field of the TDLS response frame (the information field of the TDLS frame shown in FIG. 1). Referring to FIG. 8, the information field of the TDLS response frame includes link ID information, status code information, association request frame body information, and dialog token information along with the QoS capability information. The format of the QoS capability information is the same as shown in FIG. 4 and thus description thereof is omitted. Similarly to the information field of the TDLS request frame, the information field of the TDLS response frame may further include an information element indicating whether the STA having transmitted it supports the PPSM AP mode and/or the PPSM client mode, for example, an extended capability information element.

Referring to FIG. 3 again, the first STA transmits a TDSL confirmation frame in response to the received TDSL response frame to the second STA through the AP (S13). In the TDLS confirmation frame, the TDLS packet type field of the TDLS shown in FIG. 1 is set to a value indicating the TDLS confirmation and the TDLS confirmation frame is encapsulated in the form of a data frame and is transmitted through the AP. In the TDLS procedure, since the management action frames are encapsulated in the form of a data frame and is transmitted through the AP without any direct association with the AP, the frames may be lost during the transmission thereof. Accordingly, in the TDLS procedure, the initiating STA (first STA) transmits the TDLS confirmation frame in response to the TDLS response frame from the peer STA (second STA).

In this way, after the TDLS request frame, the TDLS response frame, and the TDLS confirmation frame are exchanged between the first STA and the second STA, the TDLS link is completely set up between the first STA and the second STA. When the TDLS link is set up between two STAs, the first STA and the second STA can transmit data or other management frames to each other not through the AP but through the TDLS link path. Of course, the first STA and the second STA can also communicate with each other through the AP.

In the embodiment of the invention, one STA of the TDLS link can enter into the PSM. In this case, the STA is a STA supporting the PPSM client mode and the peer STA is a STA supporting the PPSM AP mode. When one STA enters into the PSM, the STA changes the data receiving path to the AP path, or stops the reception of data through the direct Rx path of the TDLS link but can maintain the TDLS link. In the latter, the STA can enter into the PPSM client mode after transmitting the frame having the power management bit set to the peer STA.

Figure 9:
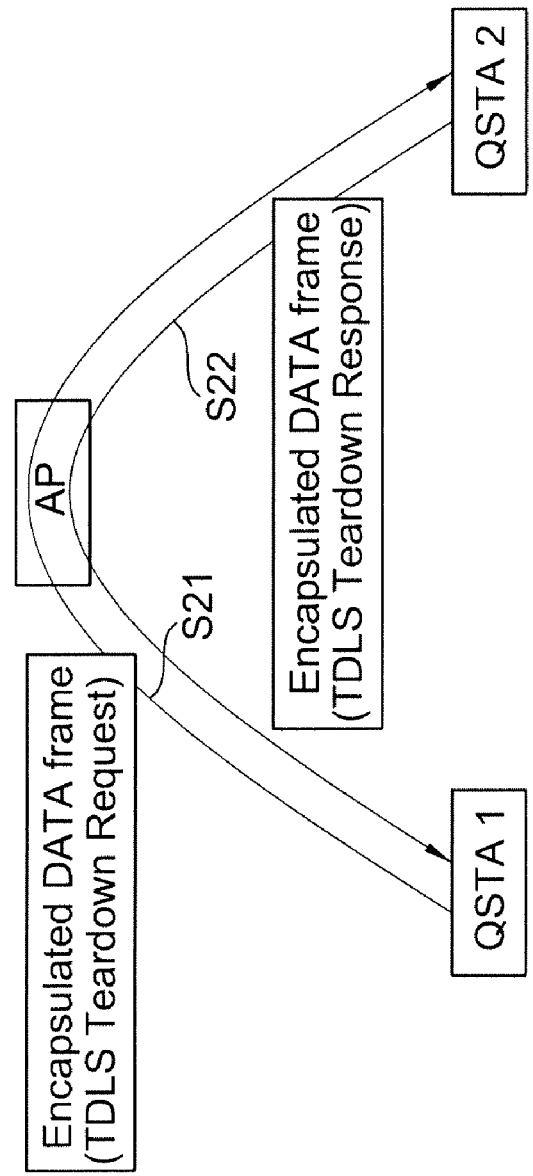
FIG. 9 is a message flowchart illustrating a TDLS teardown procedure.

A TDLS teardown procedure in the TDLS wireless network including the first STA and the second STA having set up the TDLS link with each other will be described now. FIG. 9 is a message flowchart illustrating the TDLS teardown procedure according to an embodiment of the invention.

Referring to FIG. 9, the STA intending to tear down the TDLS link, for example, the fist STA (STA1), transmits a TDLS teardown frame to the second STA (STA2) through the AP (S21). In this case, in the TDLS teardown request frame, the TDLS packet type field of the TDLS frame shown in FIG. 1 is set to a value indicating the TDLS teardown request. The TDLS teardown request frame is encapsulated in the form of a data frame and is transmitted through the AP. The second STA having received the TDLS teardown request frame transmits a TDLS teardown response frame to the first STA through the AP in response to it (S22). In this case, in the TDLS teardown response frame, the TDLS packet type field of the TDLS frame shown in FIG. 1 is set to a value indicating the TDLS teardown response. In this way, after the TDLS teardown request frame and the TDLS teardown response frame are exchanged between two QSTAs having set up the TDLS link, the TDLS teardown procedure is ended.

A procedure of allowing one of a pair of STAs having set up the TDLS link to enter into the PSM will be described now. The STAs having set up the TDLS link may enter into the PSM after changing the data receiving path to the AP path, but the PPSM in which the data receiving path is maintained in the TDLS link will be described below.

In the TDLS wireless network employing the embodiment of the invention, the first STA supporting the PPSM client mode can enter into the PSM after having set up the TDLS link. When the second STA as the opposite part of the TDLS link is a STA supporting the PPSM AP mode, data can be transmitted to the first STA in the PSM through the TDLS link. In this way, the service is called a PPSM in the TDLS wireless network, in which any one STA having set up the TDLS link operates in the PPSM client mode, the other STA operates in the PPSM AP mode, the STA in the PPSM AP mode buffers data for the STA in the PPSM client mode and transmits the data buffered for the STA in the PPSM client mode through the TDLS link in accordance with a predetermined procedure.

In the embodiment of the invention, the first STA intending to enter into the power save mode can enter into the PPSM client mode when the second STA as the opposite party of the TDLS link supports the PPSM AP mode. The first STA can enter into the PPSM client mode in various methods. For example, the first QSTA can enter into the PPSM client mode by transmitting the frame of which the power management information (for example, the power management bit) is set to a value (for example, "1") indicating the PSM to the second STA. In this case, the path through which the frame including the power management bit is transmitted to the second STA is not particularly limited, and the frame may be transmitted through the TDLS link or the AP path.

When the opposite party of the second STA in the TDLS link, for example, the first STA, enters into the PPSM client mode, the second STA does not transmit the data to be transmitted to the first STA, for example, MSDU, to the AP, but temporarily buffers the data in its memory. The second STA transmits the data buffered therein to the first STA through the TDLS link in accordance with a predetermined message transmitting protocol (for example, the U-APSD (Unscheduled-Automatic Power Save Delivery) procedure). In this way, the STA buffering the data to be transmitted to the STA in the PPSM client mode and transmitting the buffered data through the TDLS link is called a STA in the PPSM AP mode. As described above, the non-AP STA supporting the PPSM AP mode can inform the opposite party of the TDLS link whether it supports the PPSM AP mode, by the use of the extended capability information field of the TDLS request frame or the TDLS response frame.

When the first STA as the peer STA of the second STA is in the PPSM client mode, the second STA can operate in the PPSM AP mode or can enter into the PPSM client mode. In the latter, the second STA can enter into the PPSM client mode by transmitting the frame having the power management bit set to the peer STA during the service period (SP) started by the peer STA. Here, the service period (SP) can be started after the frame indicated by the peer traffic indication frame transmitted through the AP is transmitted.

The STA in the PPSM client mode transmitting the peer traffic indication frame switches its operation mode to the PPSM AP mode and operates in the PPSM AP mode until the service period (SP) started by the peer traffic indication frame is ended.

In this way, when one STA having set up the TDLS link (STA1 in the example shown in FIG. 3) enters into the PSM and the other STA (STA2 in the example shown in FIG. 3) maintains the AM, the first STA and the second STA are in the PPSM client mode and the PPSM AP mode, respectively. The STA in the PPSM client mode in the TDLS wireless network can operate as follows so as to receive the MSDU (MAC service data unit) or the MMPDU (MAC management protocol data unit) from the peer STA in the PPSM AP mode.

a) When the first STA in the PPSM client mode starts an unscheduled service period (SP), the second STA transmits a trigger frame to the peer STA in the PPSM AP mode. If one or more access categories (AC) do not support the deliver-enabled, the first STA can acquire the MSDU or the MMPDU belonging to the access categories by transmitting a PS-Poll frame to the second STA.

b) The first STA is awake until the data frame of which the EOSP (End of Service Period) is set to "1" among the data frames to be transmitted to itself.

c) When an additional data subfield of the unicast data frame or the management frame not belonging to the delivery-enabled access category is set to "1", the first STA in the PPSM client mode may transmit the addition PS-Poll frame. When the addition data subfield of the unicast data frame or the management frame belonging to the delivery-enabled access category is set to "1", the first STA in the PPSM client mode may transmit the addition trigger frame.

Figure 10:
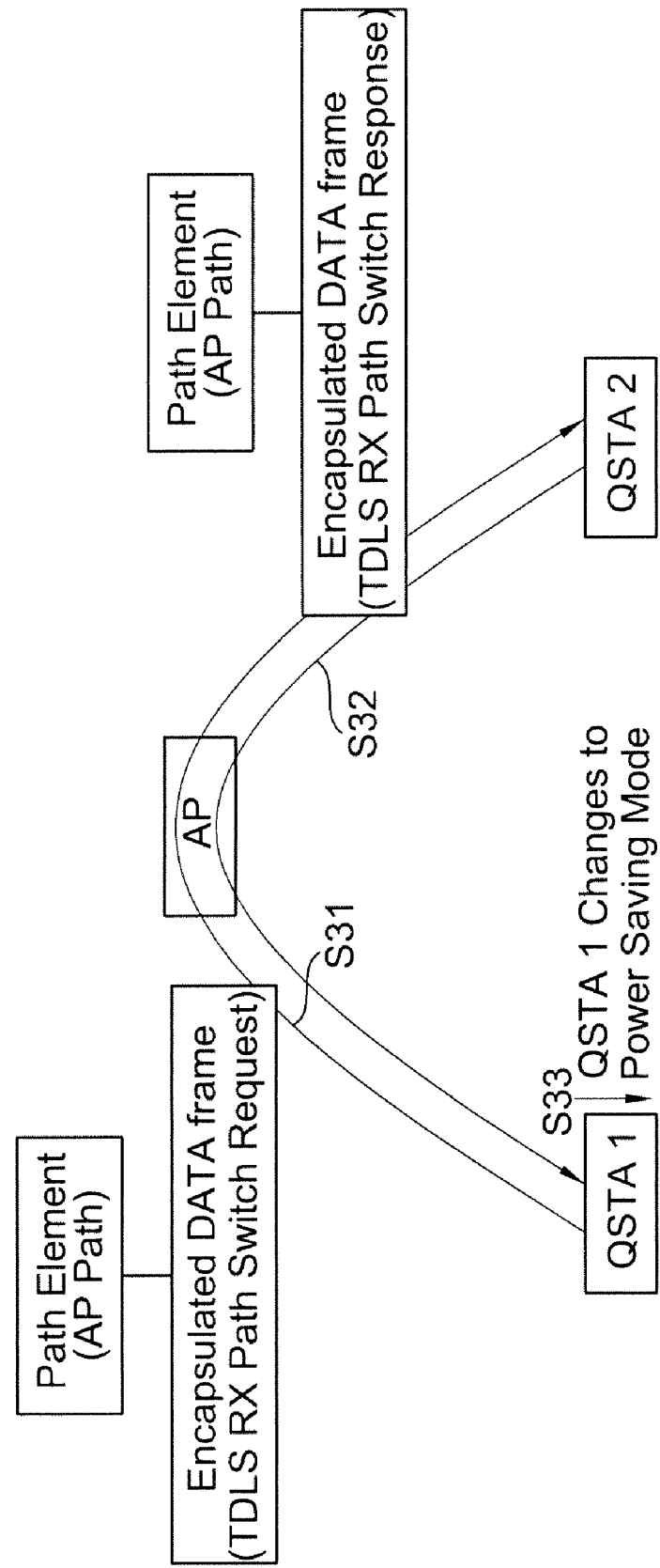
FIG. 10 is a message flowchart illustrating a procedure of allowing one of STAs set up a TDLS link to enter into a power save mode.

FIG. 10 is a message flowchart illustrating a procedure allowing one STA of the STAs having set up the TDLS link, for example, the first STA (STA1), to enter into the PSM according to another embodiment of the invention.

Referring to FIG. 10, the first STA (STA1) intending to enter into the PSM transmits the TDSL Rx switch request frame to the second STA (QSTA2) through the AP (S31). In this case, in the TDLS Rx switch request frame, the TDLS packet type field of the TDLS frame shown in FIG. 1 is set to a value indicating the TDLS Rx switch request. The TDLS Rx switch request frame can include information indicating the target receiving path, for example, a path element. In this case, similarly to the above-mentioned embodiment, the power save mode bit included in the TDLS Rx switch request frame can be set to "1".

In general, the value set to the path element of the TDLS Rx switch request frame transmitted by the STA to enter into the PSM may be a value indicating the "AP path". This value can be applied when STA1 intends to receive the data through the TDLS link in the power save mode. However, the embodiment of the invention is not limited to it, but when it is intended to receive the data through the TDLS link in the power save mode, the path element may be set to "TDLS link". Hereinafter, the former is described.

The second STA having received the TDLS Rx switch request frame transmits a TDLS Rx switch response frame to the first STA through the AP in response thereto (S32). In this case, in the TDLS Rx switch response frame, the TDLS packet type field of the TDLS frame shown in FIG. 1 is set to a value indicating the TDLS Rx switch request. The TDLS Rx switch response frame may include a path element.

In this way, when the TDLS Rx switch request frame and the TDLS Rx switch response frame are exchanged between two STAs having set up the TDLS link, the first STA can enter into the power save mode (S33).

Figure 11:
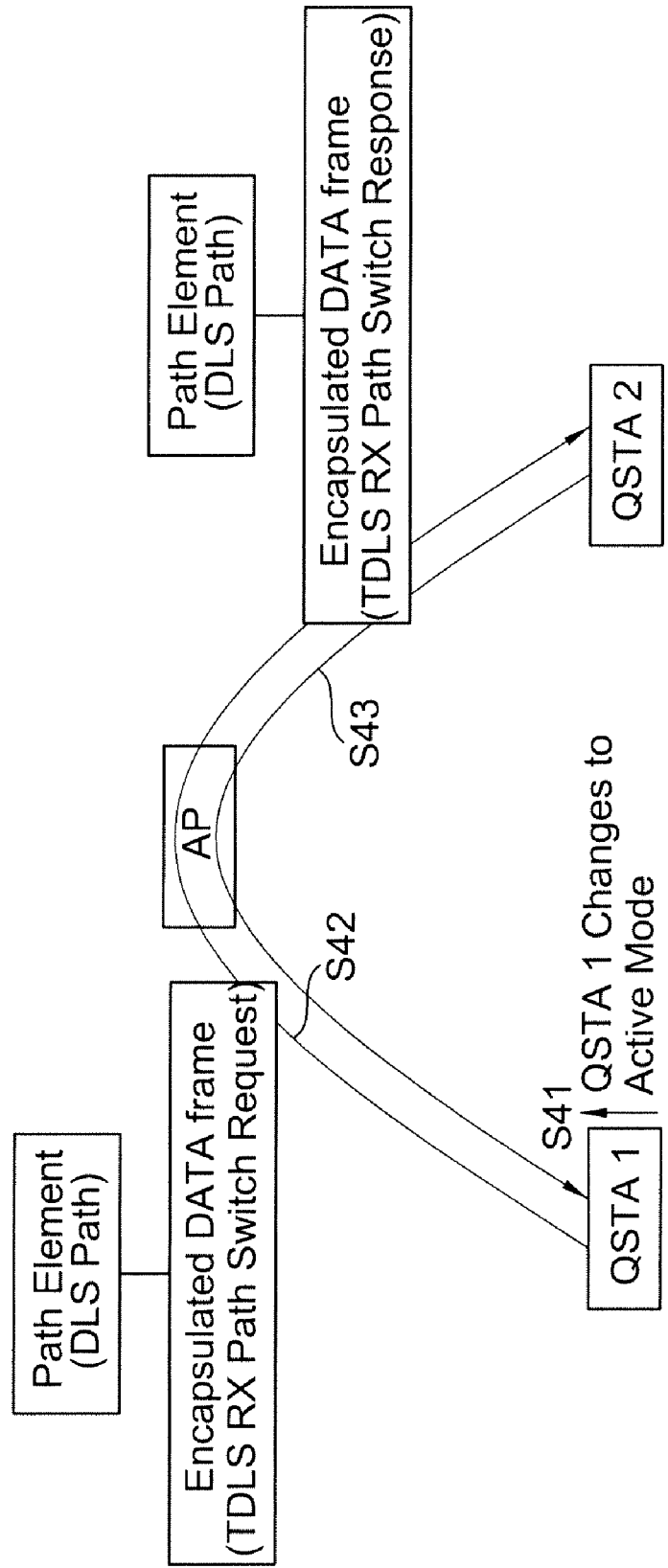
FIG. 11 is a message flowchart illustrating a procedure of allowing a STA, which sets up the TDLS link and operates in the power save mode, to tear down the power save mode and to enter into an active mode.

A procedure of switching one of the STAs having set up the TDLS link from the power save mode to the active mode will be described as a procedure applicable to the embodiment of the invention. FIG. 11 is a message flowchart illustrating a procedure of allowing the STA having set up the TDLS link to switch the PSM to the active mode.

Referring to FIG. 11, the first STA (STA1) intending to switch the power save mode to the active mode switches its power management mode from the power save mode to the active mode (S41). Then, the first STA (STA1) transmits the TDLS Rx switch request frame to the second STA (STA2) through the AP (S42). In this case, in the TDLS Rx switch request frame, the TDLS packet type field of the TDLS frame shown in FIG. 1 is set to a value indicating the TDLS Rx switch request. The value set as the path element of the TDLS Rx switch request frame generally includes a value indicating the "TDLS link", but is not limited to it.

The second STA having received the TDLS Rx switch request frame transmits the TDLS Rx switch response frame to the first STA through the AP in response to it (S43). In this case, in the TDLS Rx switch response frame, the TDLS packet type field of the TDLS frame shown in FIG. 1 is set to a value indicating the TDLS Rx switch response. The TDLS Rx switch response frame may also include a path element.

A procedure of allowing the first STA in the PPSM AP mode to transmit data to the second STA through the TDLS link according to an embodiment of the invention will be described now. According to the embodiment of the invention, the TDLS TIM broadcast frame is used, but the frame name is exemplary and is not limited to the embodiment. For example, the frame may be called a peer traffic indication frame.

Figure 12:
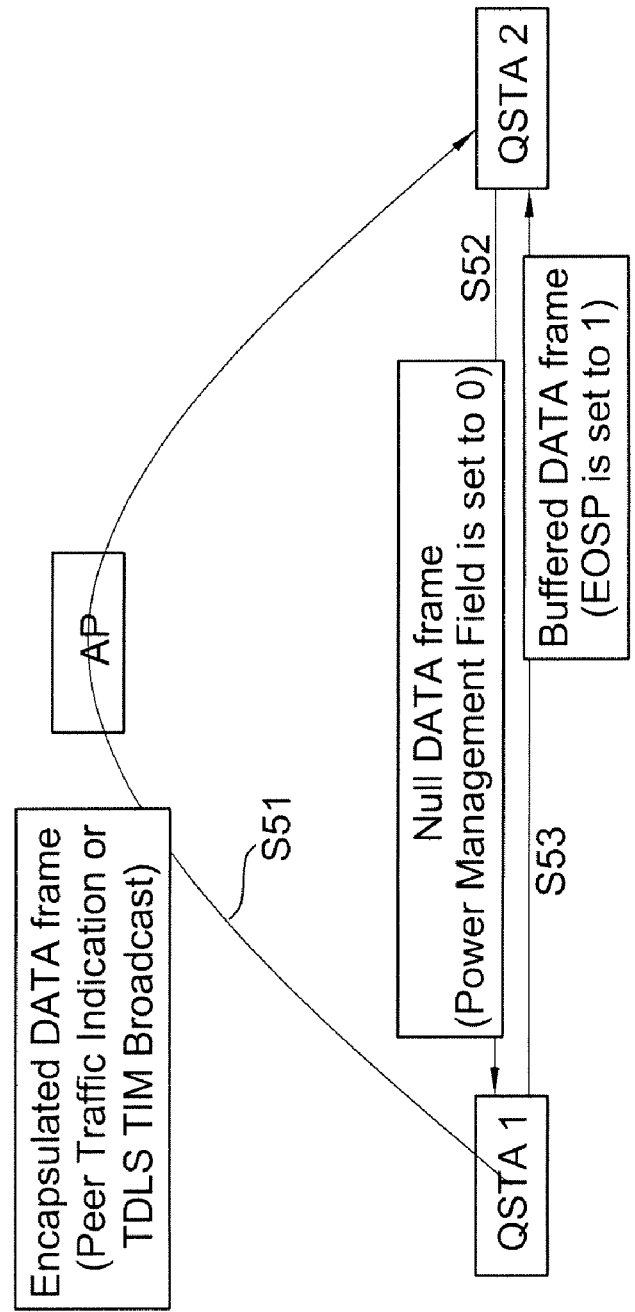
FIG. 12 is a message flowchart illustrating a procedure of allowing a first STA STA1 to transmit data to a second STA STA2 through a TDLS path according to a first embodiment of the invention.

FIG. 12 is a message flowchart illustrating a procedure of allowing the first STA (STA1) having set up the TDLS link in the TDLS wireless network to transmit data to the second STA (STA2) through the TDLS link according to a first embodiment of the invention. In this embodiment, it is assumed that the second STA operates in the PPSM client mode. The second STA can enter into the PPSM client mode by transmitting the frame of which the power management bit is set to "1" to the first STA. The first STA may operate in the PPSM AP mode while maintaining the AM or may enter into the PSM. Only the former is described below.

First, the first STA transmits the traffic buffering indication message indicating that there is data to be transmitted to the second STA to the second STA (S51). The type of the traffic buffering indication message is not limited. For example, as shown in FIG. 2, the traffic buffering indication message may be a new type of TDLS management action frame (for example, peer traffic indication frame having a TDLS type value of "9" or TDLS TIM broadcast frame and the frame name is not particularly limited) or a type in which a field containing the information is added to the TDLS management action frame currently known.

Table 2 shows an example of information included in the peer traffic indication frame according to the embodiment. The peer traffic indication frame indicates information on the data buffered by the STA (that is the STA in the PPSM AP mode) for the STA in the PPSM client mode, that is, a power save buffer status of the STA. The status of the power save buffer can be expressed every AC.

TABLE 2

| Order | Information | Notes |
|---|---|---|
| 1 | Link Identifier | The Link Identifier is specified in 7.3.2.z1. |
| 2 | AC0 backlogged | 1 octet field which is zero if the AC0 is empty and is non-zero otherwise |
| 3 | AC1 backlogged | 1 octet field which is zero if the AC1 is empty and is non-zero otherwise |
| 4 | AC2 backlogged | 1 octet field which is zero if the AC2 is empty and is non-zero otherwise |
| 5 | AC3 backlogged | 1 octet field which is zero if the AC3 is empty and is non-zero otherwise |
| 6 | Peer PSM Indication Window | 1 octet field which indicates the minimum interval between successive Peer Traffic Indication frames sent to the same peer, expressed in Beacon Intervals. (Optional) |

Referring to Table 2, the peer traffic indication frame includes the information (AC0 backlogged, AC1 backlogged, AC2 backlogged, and AC3 backlogged) indicating whether there is backlogged data every link identifier and AC and the PPSM indication window.

Similarly to other TDLS management action frames, the traffic buffering indication message may be encapsulated in the form of a data frame and may be transmitted to the second STA through the AP. For example, the frame format transmitted from the first STA to the AP may be different from the frame format transmitted from the AP to the second STA. More particularly, as described later in a second embodiment, the first STA may inform the AP that data to be transmitted to the second STA remains in a predetermined frame format and the AP may inform the second STA that data to be transmitted from the first STA remains using a traffic indication message (TIM) included in the beacon frame or a message similar thereto.

The embodiment of the invention is different from the conventional procedure of transmitting data frames to stations in the power save mode. That is, in the conventional data frame transmitting procedure, when data frames to be transmitted from the first STA remains, the data frames are first transmitted to the AP. Then, the AP informs the second STA that data frames to be received remain using the TIM included in the beacon frame. The second STA receives the data from the AP. However, in the embodiment of the invention, the first STA having data frames to be transmitted directly stores the data frames therein and does not transmit the data frames to the AP. Then, the AP informs the second STA that data frames to be received remain. That is, the AP does not transmit data, but informs the second STA only that data frames to be transmitted from the first STA remain or transmits a TDLS frame having such intention (that is, relays the TDLS frames which are encapsulated in the form of a data frame).

Referring to FIG. 12, the second STA (QSTA2) receiving the traffic buffering indication message (for example, the peer traffic indication frame or the TDLS TIM broadcast frame) and knowing that data to be received from the first STA remain transmits a message requesting for the transmission of the remaining data, that is, the frame transmission request message, to the first STA (S52). The path for transmitting the frame transmission request message is not particularly limited. For example, as shown in FIG. 12, the frame transmission request message may be transmitted from the second STA to the first STA through the TDLS link or through the AP. In the latter, the frame transmission request message may be encapsulated in the form of a data frame and may be transmitted, similarly to the other TDLS frames.

The frame transmission request message transmitted from the second STA to the first STA may be a trigger frame or a PS-poll (power save-poll) frame. As shown in FIG. 12, the frame transmission request message may be a null data frame of which the power management bit is set to "0" (value indicating the active mode). The frame transmission request message may further include information on the transmission path through which the second STA hopes to receive the data frame from the first STA, or the frame transmission request message may be defined to indicate the data frame is transmitted through the TDLS link.

The first STA having received the frame transmission request message from the second STA sequentially transmits the buffered data frame to the second STA through the TDLS link (S53). In this case, when data to be transmitted remains, the first STA transmits the data frame having an end of service period field (EOSP) set to "0" to the second STA through the TDLS link. After all the buffered data frames are transmitted or when the final data frame of the buffered frames is transmitted, a data frame of which a value of the end of service period (EOSP) field is set to "1" is transmitted. Accordingly, by informing the second STA that no data frame to be transmitted remains, the second STA can be allowed to enter into the power save mode. In this case, the second STA having received the message having the EOSP of "1" may enter into the power save mode in accordance with the conventional procedure (procedure shown in FIG. 10), or may not inform the first STA of the fact but enter into the power save mode, or may enter into the PPSM client mode after transmitting the frame of which the power management bit is set to "1".

FIG. 13 is a message flowchart illustrating a procedure of allowing the first STA (STA1) to transmit data to the second STA (STA2) through the TDLS link according to a second embodiment of the invention. In this embodiment, it is also assumed that the first STA operates in the PPSM AP mode and the second STA operates in the PPSM client mode.

Referring to FIG. 13, the first STA transmits the traffic buffering indication message for informing the second STA that data to be transmitted remains, for example, the peer traffic indication frame or the TDLS TIM broadcast frame, to the AP (S61). The type of the traffic buffering indication message is not limited. The traffic buffering indication message may be encapsulated in the form of a data frame and transmitted to the AP, similarly to the other TDLS management active frames, or may be transmitted in the form of a general management active frame.

The AP having received the traffic buffering indication message from the first STA periodically transmits the beacon frame (S62). The beacon frame may be broadcast from the AP for the other STAs (for example, the non-AP STA connected to the AP, such as the first STA and the second STA). The beacon frame may be transmitted, for example, at the TIM interval or at the delivery traffic indication message (DTIM) interval. The AP transmits the traffic buffering indication message (the peer traffic indication frame or the TDLS TIM broadcast frame), which has been received along with the beacon frame or separately from the beacon frame, at the DTIM interval equal to or different from that of the beacon frame (S63). In this case, the traffic buffering indication message may be transmitted so that the type encapsulated in the form of a data frame is relayed without any change.

The embodiment of the invention is different from the conventional procedure of transmitting a data frame to a station in the power save mode. That is, in the conventional data frame transmitting procedure, when the first STA has a data frame to be transmitted, the first STA first transmits the data frame to the AP. Then, the AP informs the second STA that the data frame to be received remains using the TIM included in the beacon frame. However, in the embodiment of the invention, the first STA having a data frame to be transmitted buffers the data frame therein and does not transmit the data to the AP. Then, the AP does not inform the second STA that a data frame to be received remains, but that a data frame to be transmitted from the first STA remains.

The second STA having known that the data frame to be received from the first STA by the use of the received traffic buffering indication message transmits the frame transmission request message for requesting for the transmission of the data frame to the first STA (S64). As shown in the figure, the frame transmission request message may be transmitted from the second STA to the first STA through the TDLS link, or through the AP when the transmission path set up between the first STA and the second STA is the AP path. In the latter, the frame transmission request message may be encapsulated in the form of a data frame and may be transmitted, similarly to the other TDLS frames.

The frame transmission request message transmitted from the second STA to the first STA may be, for example, a trigger frame or a PS-Poll frame. The frame transmission request message may be null data frame of which the power management bit is set to "0" (value indicating an active mode). The frame transmission request message may further include information on the transmission path through which the second STA hopes to receive the data frame from the first STA, or the frame transmission request message may be defined to indicate the data frame is transmitted through the TDLS link.

The first STA having received the frame transmission request message from the second STA sequentially transmits the buffered data frame to the second STA through the TDLS link (S65). In this case, when data to be transmitted remains, the EOSP of the data frame to be transmitted may be set to "0". In some embodiment, after all the buffered data frames are transmitted or when the final data frame of the buffered frames is transmitted as shown in the figure, the value of the EOSP field may be set to "1". Accordingly, by informing the second STA that no data frame to be transmitted remains, the second STA can be allowed to enter into the power save mode.

In this case, the second STA having received the message having the EOSP of "1" may enter into the power save mode in accordance with the conventional procedure, or may not inform the first STA of the fact but enter into the power save mode. In this embodiment, the second STA may transmit the null data frame having the power management bit of "1" (value indicating the power save mode) to the first STA to inform the first STA that it enters into the power save mode (S66).

As described above, according to the embodiment of the invention, in order that the second STA in the PPSM client mode receives the data frames from the first STA in the PPSM AP mode, the first STA and the second STA operate in accordance with the U-APSD procedure, in principle. For example, the second STA transmits the trigger frame, the PS-Poll frame, or the null data frame having a power management bit of "0" to the first STA. The PS-Poll frame or the null data frame is used as a data transmission trigger frame for informing that the STA in the PPSM client mode hopes to directly receive the TDLS link. The peer STA in the PPSM AP mode having received the trigger frame starts the service period (SP). If the service period is going, it is not necessary to additionally generate the service period.

According to the embodiment of the invention, the peer STA should set up the trigger-enabled access category with the STA in the PPSM client mode, before sending the trigger frame and the like. This is because the trigger frame can be transmitted to only the access category (AC) set as the trigger-enabled access category to start the service period.

During the service period, the peer STA (STA in the active mode) transmits the buffered data frame to the STA in the PPSM client mode through the TDLS link. In this case, an addition PS-Poll need not be used to transmit the data frames fro the STA in the PPSM AP mode to the STA in the PPSM client mode. This is because the peer STA knows that the STA in the PPSM client mode is in the active mode during the service period. Accordingly, in this case, the data frames are transmitted to the STA in the PPSM client mode by the use of a CSMA/CA (Carrier Sense Multiple Access with Collision Avoidance) method.

After the peer STA transmits the buffered data frames to the STA in the PPSM client mode, the STA in the PPSM client mode can enter into the power save mode. Accordingly, the null data frame of which the EOSP of the QoS control field is set to "1" is transmitted to inform that the service period is over.

When the peer STA transmits the buffered data frames to the STA in the PPSM client mode through the TDLS link, the delivery-enable access category should be set. The deliver-enabled access category means the followings. Data of the AC set as the deliver-enabled access category can be transmitted through the TDLS link during the service period. In case of data of the access category not set as the delivery-enabled access category, the data frames are transmitted in accordance with the normal data transmission procedure (normal data frame transmission procedure in the power save mode). Accordingly, when receiving the PS-Poll frame from the STA of the PSM, the peer STA transmits one data frame to the STA in the PSM.

According to the embodiment of the invention, the STA in the PPSM client mode need to inform the peer STA in the PPSM AP mode as the opposite party of information on the trigger-enabled access category and the delivery-enabled access category. According to the embodiment of the invention, the information on the trigger-enabled access category and the delivery-enabled access category are included in the QoS capability information elements of the TDLS request frame and the TDLS response frame. More specifically, the information on the trigger-enabled access category and the delivery-enabled access category can be included in the QoS information field of the QoS capability information elements, which has been described above, and thus detailed description thereof is omitted.

According to an embodiment of the invention, the procedure of processing traffics (MPDU, etc.) buffered in the STA in the PPSM AP mode for the STA in the PPSM client mode is almost similar to the procedure performed by the AP in accordance with the existing U-APSD (Unscheduled-Automatic Power Save Delivery) protocol. The procedure processed by the AP in accordance with the existing U-APSD is described in detail in IEEE P802.11-REVma/D9.0 (October 2006) (Revision of IEEE Std 802.11~1999), "Draft Standard for Information Technology-Telecommunications and information exchange between systems-Local and metropolitan area networks-Specific requirements, Part 11: wireless LAN medium Access Control (MAC) and Physical Layer (PHY) specifications), details of which are omitted from the specification. The omission of the description is intended for the purpose of convenient description and the details described in the IEEE P.802.11-REVma/D9.0 (October 2006) document can be incorporated herein by reference.

However, the procedure processed by the STA in the PPSM AP mode according to the embodiment of the invention is different from the procedure processed by the AP in accordance with the existing U-APSD protocol in the following points. That is, when one AC is backlogged and one service period is not generated for the AC during the PPSM indication window period before receiving a new traffic, the STA in the PPSM AP mode transmits the peer traffic indication frame to the STA in the PPSM client mode through the AP. The peer traffic indication frame includes the information indicating the backlogged AC and can be transmitted to the STA in the PPSM client mode through the AP in the form of a unicast frame.

The procedure of processing traffics (MPDU, etc.) buffered in the STA in the PPSM AP mode, which is processed by the STA in the PPSM client mode, is almost similar to the procedure performed by the non-AP STA in accordance with the existing U-APSD (Unscheduled-Automatic Power Save Delivery) protocol. The procedure processed by the AP in accordance with the existing U-APSD is described in detail in IEEE P802.11-REVma/D9.0 (October 2006) (Revision of IEEE Std 802.11-1999), "Draft Standard for Information Technology-Telecommunications and information exchange between systems-Local and metropolitan area networks-Specific requirements, Part 11: wireless LAN medium Access Control (MAC) and Physical Layer (PHY) specifications), details of which can be incorporated herein by reference.

However, the procedure processed by the STA in the PPSM client mode according to the embodiment of the invention is different from the procedure processed by the non-AP STA in accordance with the existing U-APSD protocol in the following points. That is, the information indicating that traffics are buffered in the STA in the PPSM AP mode can be acquired from the peer traffic indication frame received from the STA in the PPSM AP mode. In order to reduce the number of peer traffic indication frames to be transmitted for a uni-directional traffic stream to be continuously transmitted without a return traffic, a new service period may be started in the PPSM indication window after the occurrence of the service interval for receiving the data MPDU.

The STA in the PPSM client mode can configure the STA in the PPSM AP mode using the following two methods so as to use the U-APSD. In the first method, the STA in the PPSM AP mode sets the individual U-APSD flag bits of the QoS information subfield of the QoS capability information element included in the TDLS request frame and/or the TDLS response frame. In the second method, the STA in the PPSM client mode sends an ADDTS (ADD traffic Stream) to the STA in the PPSM AP mode every AC to set one or more AC to trigger-enabled and to set one or more AV to delivery-enabled.

When the peer STA of a STA operates in the PPSM client mode, the STA can operate in the PPSM AP mode or enter into the PPSM client mode. In the latter, the STA can send a frame having a power management bit set to the STA operating in the PPSM client mode during a service period started by the peer STA. The SP may start after the frame is indicated by the peer traffic indication frame sent through the access point.

A STA in the PPESM client mode transmitting a peer traffic indication frame shall switch to the PPSM AP mode until the end of the SP started by the peer traffic indication frame.

The embodiments described above in detail are only an example explaining the technical spirit of the invention and it should be understood that the technical spirit is limited to the embodiments. The scope of the invention is defined by the appended claims.

What is claimed is:

1. A communication method in a Tunneled Direct Link Setup (TDLS) wireless network, the communication procedure comprising:
   transmitting, from an initiating station to a peer station through an access point, a TDLS setup request frame;
   transmitting, from the peer station to the initiating station through the access point, a TDLS setup response frame with status code 'successful';
   establishing a TDLS link by transmitting, from the initiating station to the peer station through the access point, a TDLS setup confirm frame for confirming receipt of the TDLS setup response frame;
   entering, by a first station, a Power Save Mode (PSM) remaining on the TDLS link by notifying a second station;
   buffering, by the second station, traffic for the first station;
   transmitting, from the second station to the first station through the access point, an indication frame if the traffice for the first station is buffered and one or more periods of an indication window have expired after a last service period, the indication frame indicating that the traffic is buffered at the second station and including a plurality of fields, each of the plurality of fields indicating a power save buffer state per access category (AC); and
   transmitting, from the second station to the first station, the buffered traffic using a U-APSD (Unscheduled-Atomatic Power Save Delivery) procedure;
   wherein the indication window indicates a minimum interval in Beacon intervals between successive indication frames,
   wherein the first station is one of the initiating station and the peer station and the second station is the other of the initiating station and the peer station, and
   wherein U-ASPD bits in a Quality of Service (QoS) Info subfield of a QoS Capability element carried in either the TDLS setup request frame or the TDLS setup response frame are set to a value for using a U-APSD procedure.

2. The communication method according to claim 1, further comprising transmitting, by the first station, a frame with power management bit set in order to notify the second station that the first station will enter PSM.

3. The communication method according to claim 1, further comprising designating, by the first station, one or more access categories as trigger-enabled and one or more access categories as deliver-enabled by sending an ADDTS request frame per access category to the second station in order to configure the second station to use the U-APSD procedure.

4. An apparatus in a Tunneled Direct Link Setup (TDLS) wireless network, the apparatus comprising a processor configured to:
   establish a TDLS link with a peer station through an access point by exchanging a TDLS setup request frame and a TDLS setup response frame;
   buffer traffic for the peer station that is in a Power Save Mode (PSM) remaining on the TDLS link;
   transmit an indication frame to the peer station through the access point if the traffic for the peer station is buffered and one or more periods of an indication window have expired after a last service period, the indication frame indicating that the traffic is buffered and including a plurality of fields, each of the plurality of fields indicating a power save buffer state per access category (AC); and
   transmit the buffered traffic to the peer station using a U-APSD (Unscheduled-Automatic Power Save Delivery) procedure;
   wherein the indication window indicates a minimum interval in Beacon intervals between successive indication frames, and
   wherein U-APSD bits in a Quality of Service (QoS) Info subfield of a QoS Capability element carried in either the TDLS setup request frame or the TDLS setup response frame are set to a value for using the U-APSD procedure.

* * * * *